(12) United States Patent
Camisasca et al.

(10) Patent No.: US 10,843,642 B2
(45) Date of Patent: Nov. 24, 2020

(54) LICENSE PLATE FASTENER HEAD CAP ASSEMBLY

(71) Applicant: CAMISASCA AUTOMOTIVE MANUFACTURING, INC., Lake Forest, CA (US)

(72) Inventors: Henry P. Camisasca, Lake Forest, CA (US); Colin Camisasca, Lake Forest, CA (US)

(73) Assignee: Camisasca Automotive Manufacturing, Inc., Lake Forest, CA (US)

( * ) Notice: Subject to any disclaimer, the term of this patent is extended or adjusted under 35 U.S.C. 154(b) by 246 days.

(21) Appl. No.: 16/021,895

(22) Filed: Jun. 28, 2018

(65) Prior Publication Data

US 2019/0291662 A1    Sep. 26, 2019

Related U.S. Application Data

(60) Provisional application No. 62/646,268, filed on Mar. 21, 2018.

(51) Int. Cl.
*F16B 37/14* (2006.01)
*B60R 13/10* (2006.01)

(52) U.S. Cl.
CPC ............ *B60R 13/105* (2013.01); *F16B 37/14* (2013.01)

(58) Field of Classification Search
CPC ....... B60R 13/105; F16B 37/14; Y10S 411/91
USPC ........................... 411/372.5, 372.6, 373, 374
See application file for complete search history.

(56) References Cited

U.S. PATENT DOCUMENTS

| | | | | |
|---|---|---|---|---|
| 1,805,937 A | | 5/1931 | Berge | |
| 1,938,878 A | * | 12/1933 | Blankensteyn | ....... B60R 13/105 40/202 |
| 3,485,134 A | * | 12/1969 | Ott | .......... F16B 37/14 411/372 |
| 3,930,432 A | * | 1/1976 | Puchy | ..................... F16B 37/14 411/376 |
| 4,136,598 A | * | 1/1979 | Hughes | ................... F16B 37/14 411/372 |
| 4,601,624 A | * | 7/1986 | Hill | ......... F16B 37/14 411/373 |
| 4,824,305 A | | 4/1989 | McCauley | |
| 5,653,564 A | * | 8/1997 | Nakamura | .............. F16B 37/14 411/373 |
| 5,749,690 A | * | 5/1998 | Kutz | ..................... F16B 41/005 411/431 |
| 5,988,966 A | * | 11/1999 | Chen | ...................... F16B 37/14 411/372 |
| 6,964,549 B2 | | 11/2005 | Fallon | |
| 8,011,866 B2 | | 9/2011 | Harris | |
| 8,051,690 B2 | | 11/2011 | Camisasca | |
| 9,133,874 B2 | | 9/2015 | Hill | |

(Continued)

Primary Examiner — Roberta S Delisle
(74) Attorney, Agent, or Firm — Knobbe, Martens, Olson & Bear, LLP

(57) ABSTRACT

A hardware hider cap assembly is provided for covering a fastener, and more specifically, covering a fastener head. The hider cap assembly can include a base member with an opening for receiving the fastener and a cap member releasably coupled to the base member via a threaded engagement. The cap member can include a tab or protrusion configured to engage with a notch in the base member, thereby preventing overtightening of the cap member onto the base member.

12 Claims, 11 Drawing Sheets

(56) References Cited

U.S. PATENT DOCUMENTS

| | | |
|---|---|---|
| 9,283,904 B2 | 3/2016 | Parenti |
| 9,744,923 B2 | 8/2017 | Parenti |
| 2004/0170487 A1 | 9/2004 | Thompson |
| 2010/0300035 A1* | 12/2010 | Pither ............... F16B 37/14 |
| | | 52/745.21 |
| 2015/0007523 A1* | 1/2015 | McPheeters ......... F16B 5/0275 |
| | | 52/741.1 |
| 2015/0345533 A1* | 12/2015 | Hill .................. F16B 37/14 |
| | | 411/374 |
| 2015/0367954 A1* | 12/2015 | Rebbeck ............. B64D 37/32 |
| | | 361/218 |

\* cited by examiner

LICENSE PLATE FASTENER HEAD CAP ASSEMBLY

BACKGROUND OF THE INVENTIONS

Field of the Invention

The present application is directed generally toward caps for license plate fasteners, and specifically toward license plate fastener caps that prevent overtightening of the caps.

Description of the Related Art

Hardware hider caps are used by manufacturers and/or consumers, such as for example in the automotive industry, to hide and protect hardware while providing a more aesthetically pleasing final product. For example, hardware hider caps are commonly used to cover license plate and license plate frame fasteners. A challenge of current hider caps is that the cap lids can become loose if under-tightened and can be difficult to remove by hand if overtightened. Further, overtightening the cap can result in damaging the assembly, for example by stripping the cap threads. The embodiments presented below address these challenges or at least provide the public with a useful choice.

SUMMARY OF THE INVENTION

The systems, methods and devices described herein have innovative aspects, no single one of which is indispensable or solely responsible for their desirable attributes. Without limiting the scope of the claims, some of the advantageous features will now be summarized.

In some configurations, a hider cap kit includes a cap member comprising a threaded interior wall and a tab protruding from the threaded interior wall. The kit also includes a base member configured to be releasably coupled to the cap member. The base member comprises a base having an opening for receiving the end of a fastener. A threaded wall extends from the base. A notch in the threaded wall is configured for receiving the tab. The base member and the cap member form a cavity that receives and accommodates a head of the fastener. In response to rotating the cap member onto the base member, the tab engages an edge of the notch, thereby preventing further tightening of the cap member onto the base member.

In some configurations, the cap member can be attached to and separated from the base member by hand.

In some configurations, the engagement between the notch and the tab allows for the cap member to be untightened from the base member.

In some configurations, the cap member comprises an inner concave surface.

In some configurations, the base member has a generally cylindrical configuration.

In some configurations, the tab is formed separately from the cap member and is affixed to the cap member.

In some configurations, the cap member comprises a smooth outer convex surface.

In some configurations, the base member has a generally cylindrical shape having a diameter of approximately 16 millimeters.

In some configurations, a method of covering a fastener includes providing a cap device including a cap member having a tab formed in an interior of the cap member. The device also includes a cup-like base member configured to couple with the cap member by threaded engagement. The base member has an opening along its bottom surface for receiving an end of a fastener and a notch on a side wall for receiving the tab. A fastener is inserted through the opening. The fastener is tightened against an object with sufficient force to secure the base member between the fastener and the object. The cap member is attached to the base member by rotating the cap member. In response to rotating the cap member onto the base member, the tab engages a stop surface within the notch, thereby preventing further rotation of the cap member onto the base member.

In some configurations, the object is a license plate.

In some configurations, the fastener is a standard screw.

In some configurations, a cap assembly includes a base member comprising an opening in a bottom wall of the base member. The opening is configured to receive a fastener. A side wall extends from the bottom wall and an exterior of the side wall comprises threads. A notch is disposed on the side wall opposite the bottom wall. A cap member is configured to releasably couple with the base member. The cap member includes an interior wall comprising threads configured to engage with the threads on the exterior of the side wall of the base. A tab extends radially inward from the interior wall of the cap member and is configured to contact an edge of the notch in the side wall of the base member. In response to the tab contacting the edge of the notch, the cap member is prevented from rotating in a tightening manner onto the base member.

BRIEF DESCRIPTION OF THE DRAWINGS

These and other features and advantages of the present embodiments will become more apparent upon reading the following detailed description and with reference to the accompanying drawings of the embodiments, in which.

DETAILED DESCRIPTION

For convenience, the embodiments disclosed herein are described in the context of a hardware hider cap assembly for use with license plates and frames on vehicles. However, the embodiments can also be used with other products and/or components which are fastened. For example, the embodiments can be used to cover fasteners on other parts of a vehicle and/or on equipment or stationary objects which contain exposed hardware. The embodiments can be used in residential buildings, with bathroom fixtures, walls, and dispensers. Various other uses may also be possible.

Various features associated with different embodiments will be described below. All of the features of each embodiment, individually or together, can be combined with features of other embodiments, which combinations form part of this disclosure. Further, no feature is critical or essential to any embodiment.

Figure 1:
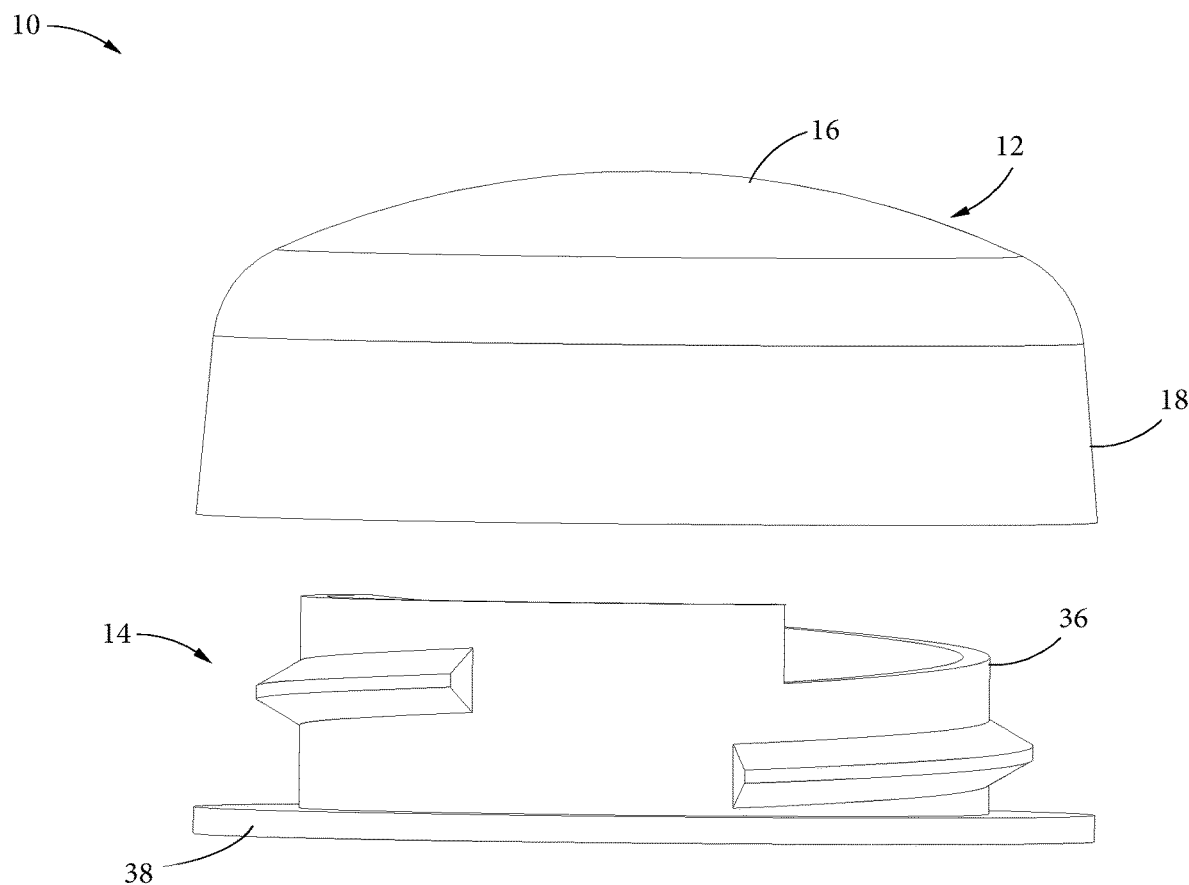
FIG. 1 is a front exploded view of an embodiment of a hider cap assembly.

With reference to FIG. 1, a hider cap assembly 10 can comprise an assembly for substantially surrounding and/or retaining the head of a fastener so as to limit access to and visibility of the fastener head. For example, an assembly 10 can comprise a cap member 12 and a base member 14. The cap member 12 and base member 14 can vary in size and shape. In some embodiments, both the cap member 12 and base member 14 can have a generally circular or cylindrical shape. The cap member 12 can be releasably coupled to the base member 14, such as for example by threaded engagement. The cap member 12 can be completely removed from the base member 14. Both the cap member 12 and base member 14 can be made from the same type of material. For example, in some embodiments, the cap member 12 and base member 14 can be comprised of plastic, such as Delrin plastic, polypropylene, PED, or other suitable plastic. In some embodiments, one or more of the cap member 12 and base member 14 can be comprised of aluminum, bright and/or polished stainless steel, or other types of metal. Other materials are also possible. In some embodiments, the cap member 12 can be comprised of a different material than the base member 14. In some embodiments, the cap member 12 can comprise components which are made from different materials. Similarly, in some embodiments, the base member 14 can comprise components which are made from different materials. The cap member 12 and/or base member 14 can be injected molded, machined, stamped, a combination of these or made by other suitable manufacturing methods.

Figure 2:
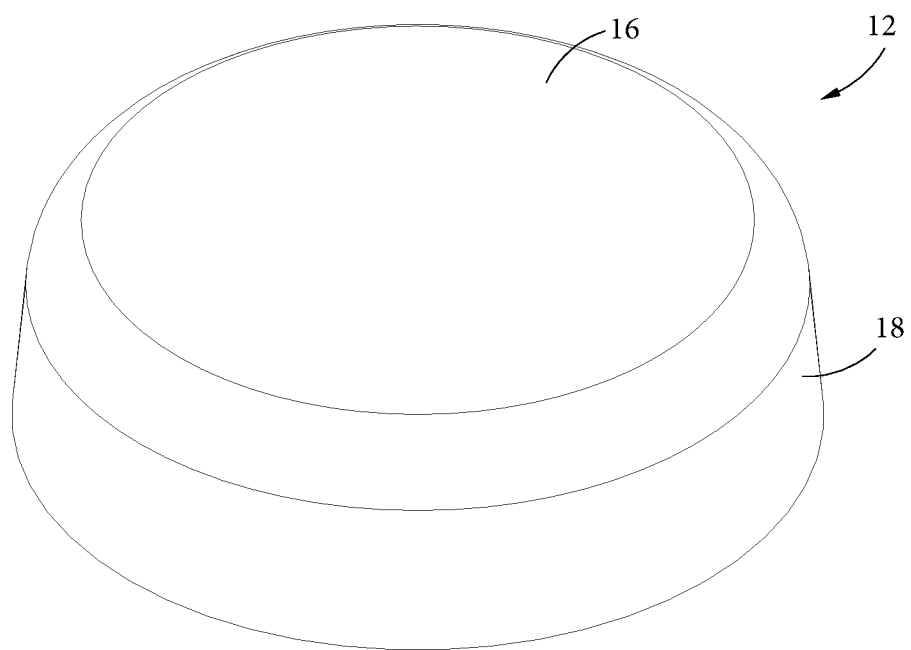
FIG. 2 is a top perspective view of a cap member of the assembly of FIG. 1.
Figure 3:
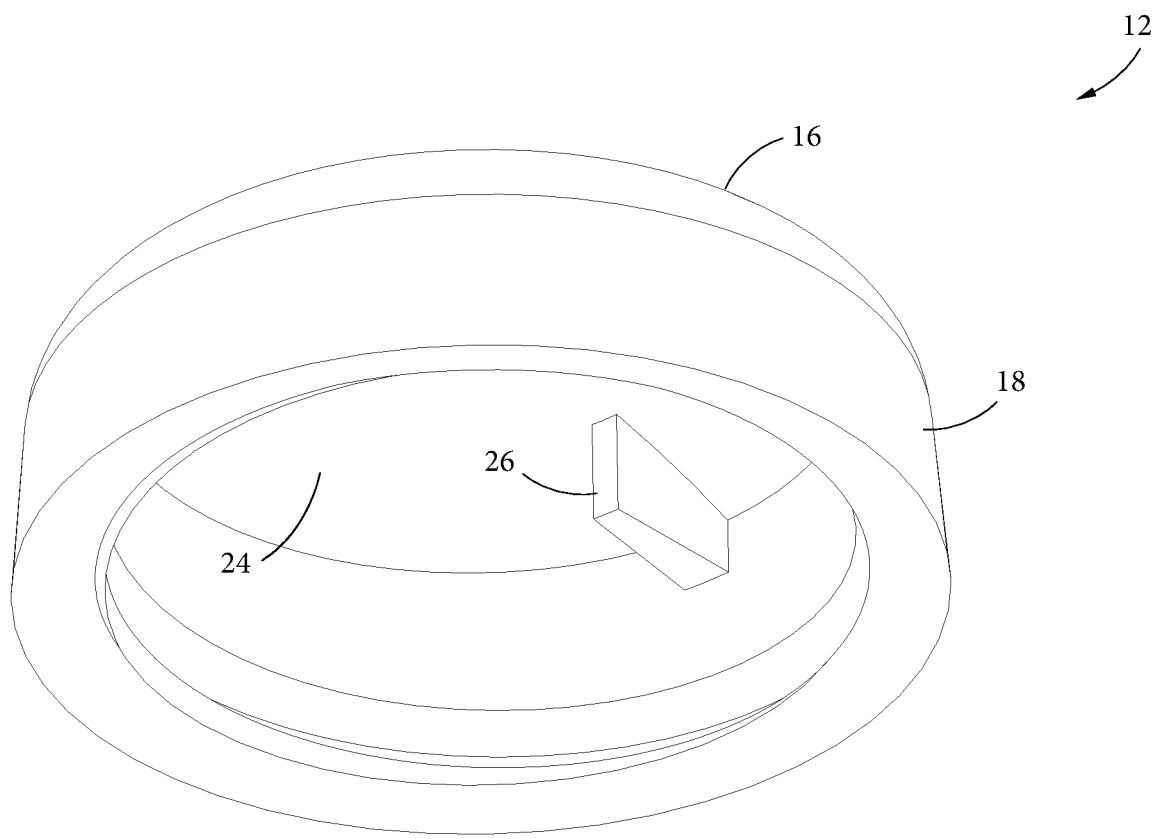
FIG. 3 is a bottom perspective view of the cap member of FIG. 2.

With reference to FIGS. 2 and 3, the cap member 12 can comprise a generally rounded (e.g. circular) shape having a generally smooth convex outer surface 16 along a top portion of the cap member 12. Other shapes and sizes for the cap member 12 are also possible. In some embodiments, the convex surface 16 can have a generally dome shape. In some embodiments, the surface 16 can be substantially flat. In some embodiments, the cap member 12 can comprise substantially a side wall 18 extending along an axis of rotation. The shape and/or contour of the cap member 12 can make it possible to grip the cap member 12 by hand or with tools separately from the base such that the cap member 12 can be rotated relative to the base member 14 in order to separate the cap member 12 from base member 14. With particular reference to FIG. 1, preferably the exposed portion of the base member 14 when the cap member 12 and the base member 14 are assembled is limited to no more than a thin flange, which has a thickness that is less than one-eighth or less than one-tenth of an overall thickness (vertical dimension in the orientation of FIG. 1) of the overall assembly. Such an arrangement facilitates the user contacting only the cap member 12 when attempting to remove the cap member 12 from the base member 14.

Figure 4:
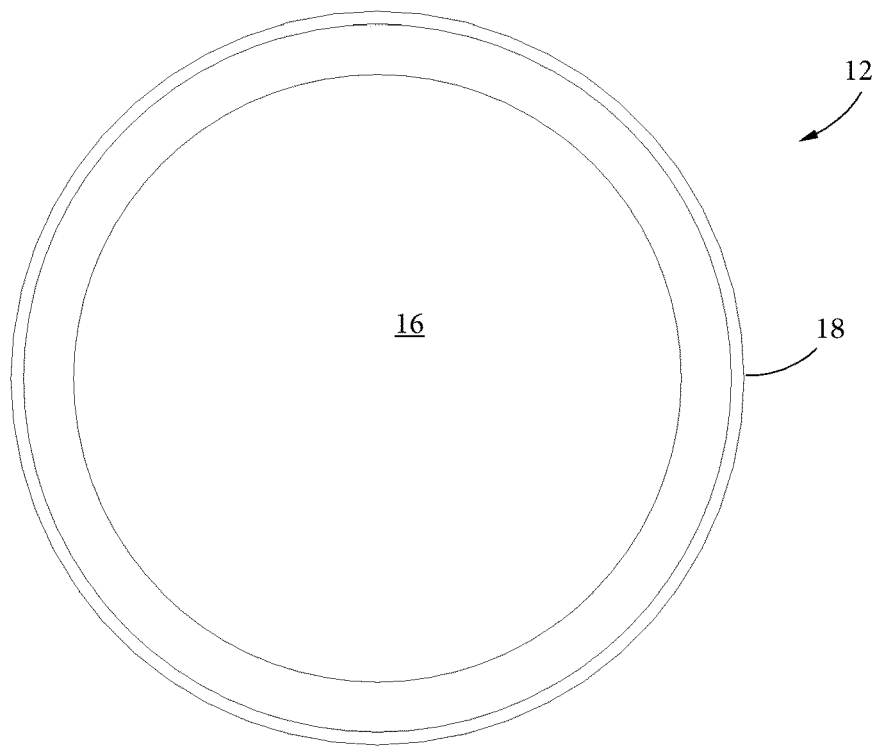
FIG. 4 is a top view of the cap member of FIG. 2.
Figure 5:
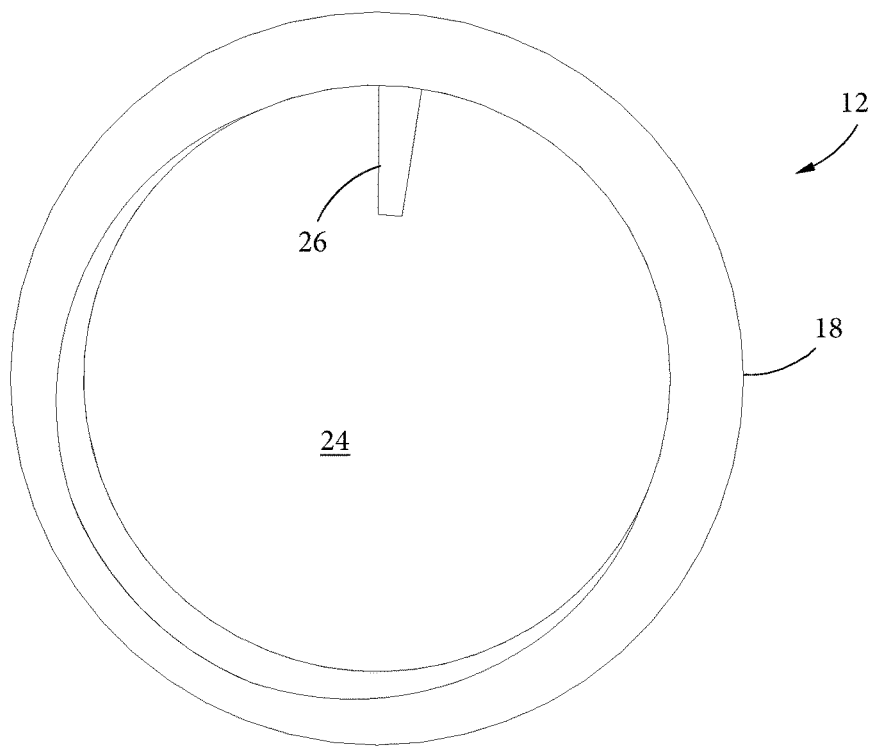
FIG. 5 is a bottom view of the cap member of FIG. 2.
Figure 6:
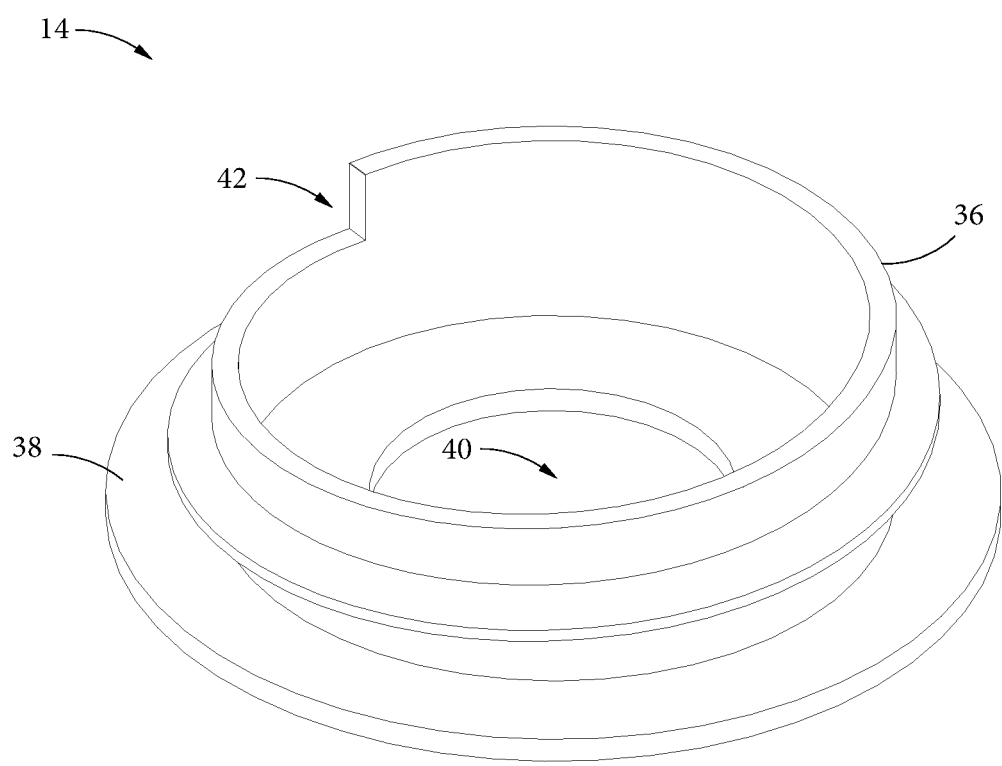
FIG. 6 is a top perspective view of a base member of the assembly of FIG. 1.
Figure 7:
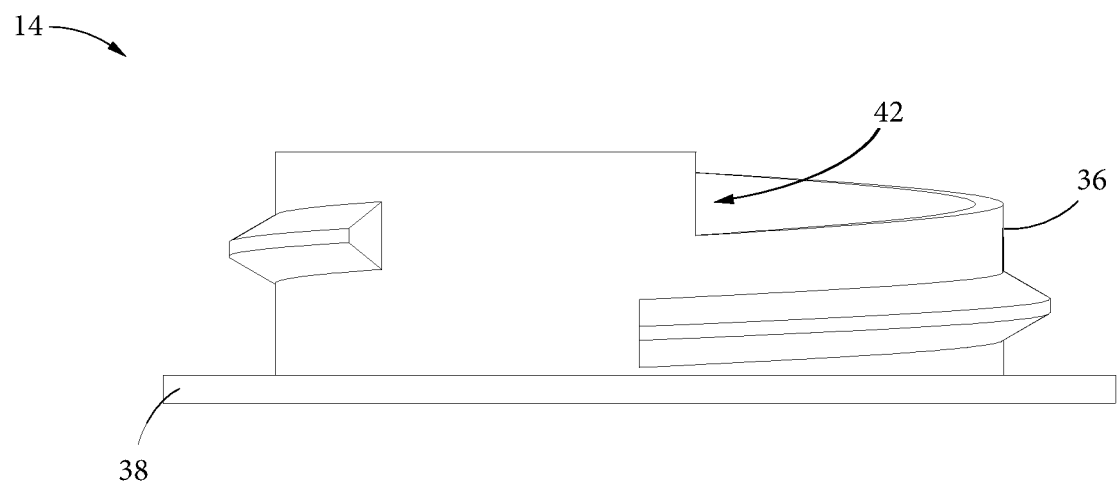
FIG. 7 is a front view of the base member of FIG. 6.
Figure 8:
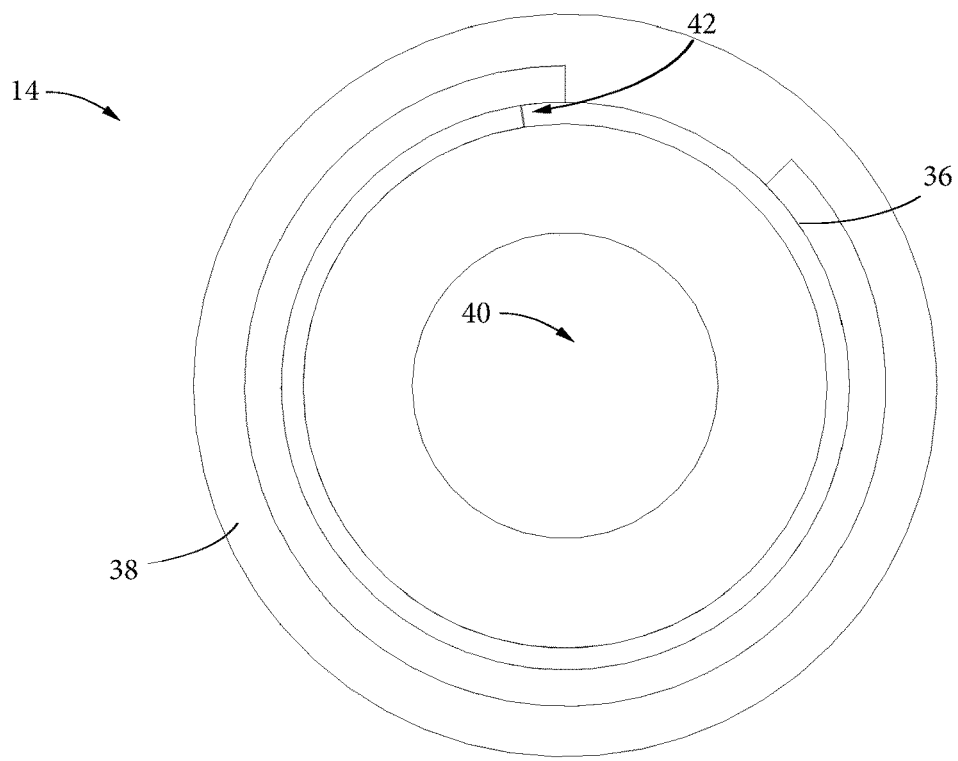
FIG. 8 is a top view of the base member of FIG. 6.
Figure 9:
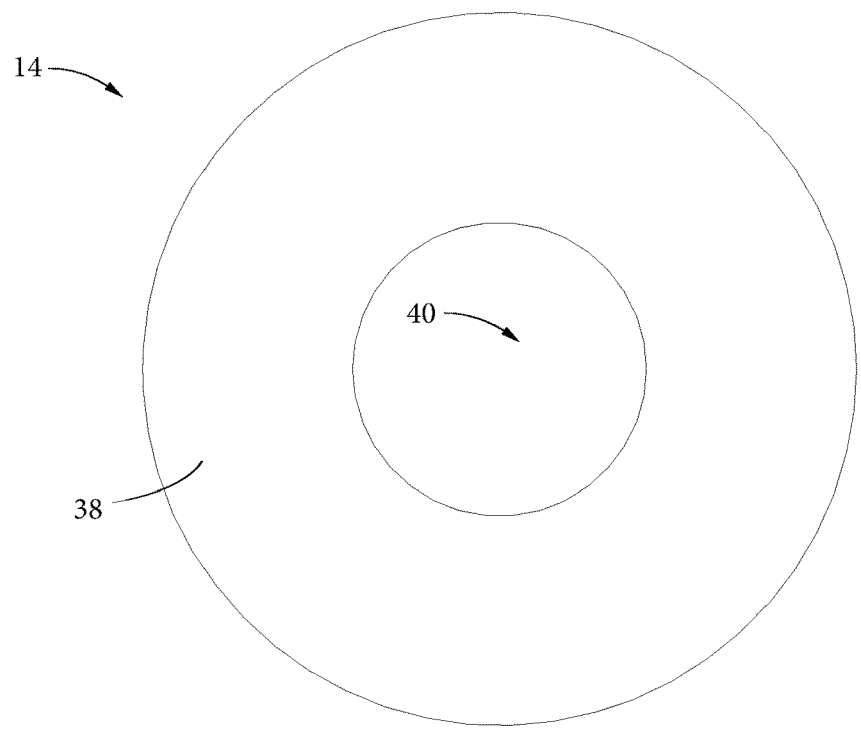
FIG. 9 is a bottom view of the base member of FIG. 6.
Figure 10:
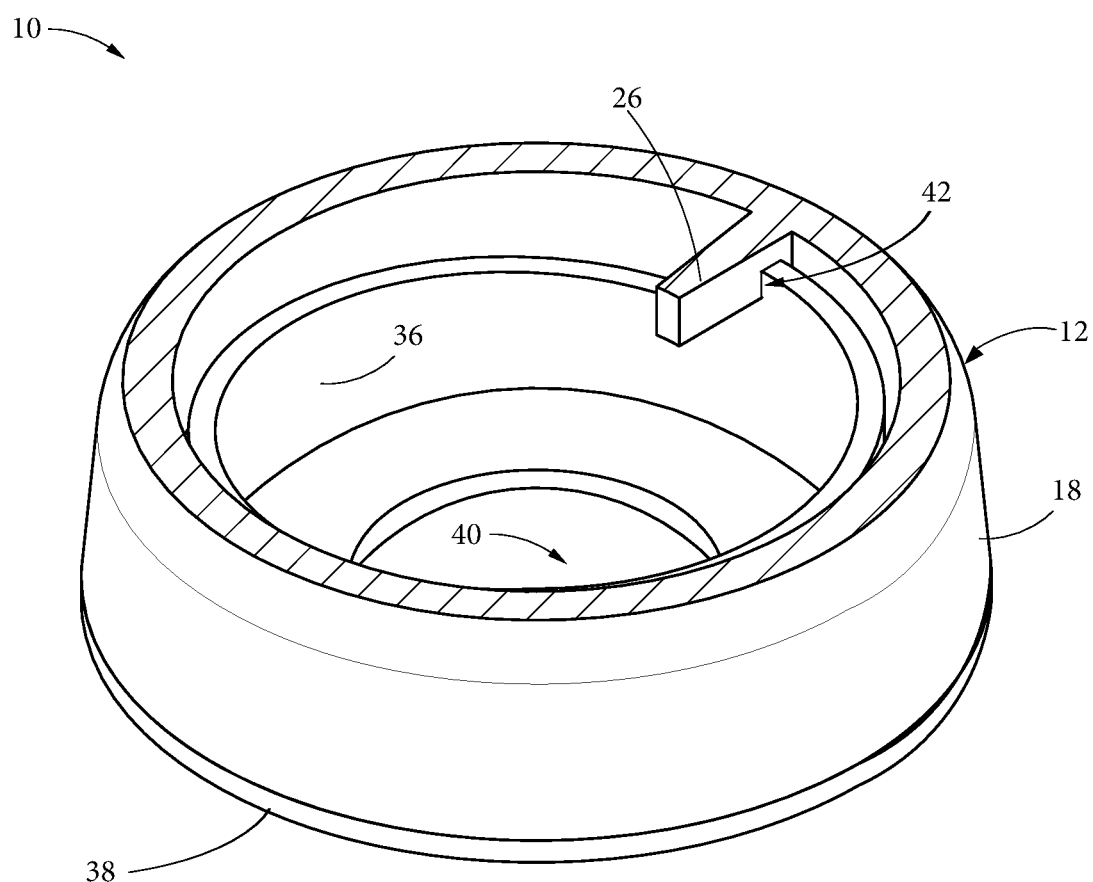
FIG. 10 is a perspective cross-sectional view of the assembly of FIG. 1.
Figure 11:
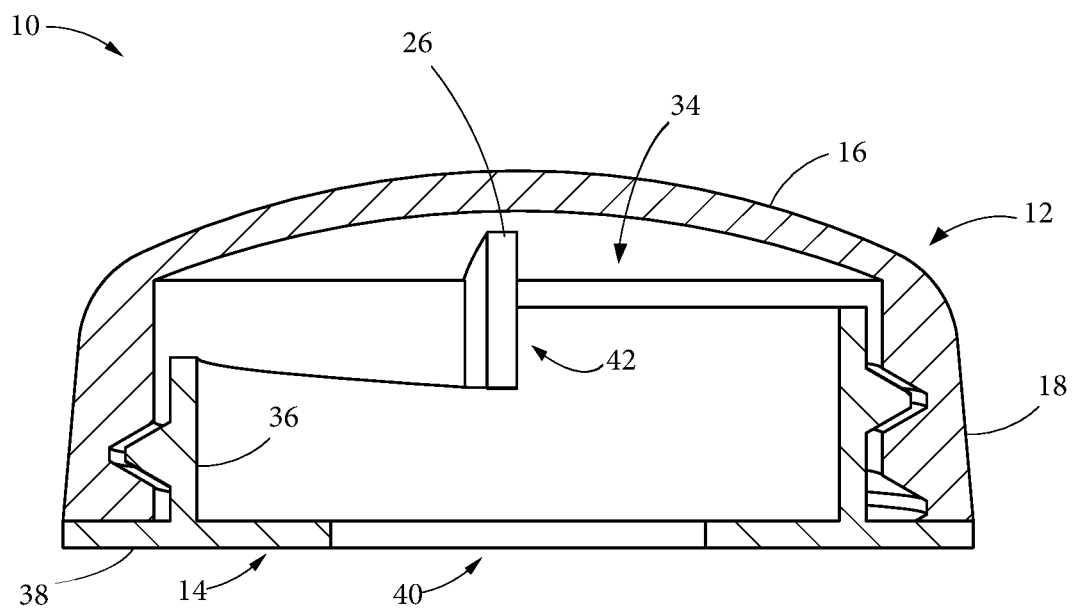
FIG. 11 is a front cross-sectional view of the assembly of FIG. 1.

With reference to FIGS. 3-5, the interior of wall 18 of the cap member 12 can be threaded. The threads can be wound in a right-hand or left-hand direction, and can include, for example, single or double threads. The threads can be used to securely attach the cap member 12 to the base member 14, thereby making it difficult to remove the cap member 12 without unscrewing the cap member 12 from the base member 14.

With continued reference to FIGS. 3-5, the cap member 12 can further comprise an interior surface 24. The interior surface 24 can be located opposite surface 16 on the top of the cap member 12, and can be concave in nature. The interior surface 24 can face towards the base member 14 when the cap member 12 and base member 14 are coupled together. The interior surface 24 can be concave to accommodate a fastener (e.g. a steel fastener) head with a convex surface, such as that shown in FIG. 12. Other shapes and configurations for interior surface 24 are also possible. For example, other shapes and sizes of fastener heads can dictate various other configurations of the interior surface 24, such that the interior surface 24 accommodates or generally remains out of contact with the fastener head.

With reference to FIGS. 3, 5, and 10-12, the cap member 12 can further comprise a protrusion or tab 26 formed in the interior of the cap member 12. The tab 26 can extend radially inward from the wall 18 at or near the top of the cap member 12, that is, at or near the top portion of the interior surface 24. The tab 26 can be formed as a unitary structure with the remainder of the cap member 12, such as by a mold using a suitable molding process. The tab 26 can be shaped and/or positioned so as to not interfere with the fastener. In some embodiments, the tab 26 extends only slightly or a relatively small distance from the wall 18 in an axial direction, which is typically aligned with a longitudinal axis of the fastener with which the assembly 10 is used, and/or in a radial direction. For instance, the tab 26 can extend less than half of the distance across the interior space of the cap 12. The tab 26 can extend from the wall 18 a distance that is approximately equal to the thickness of the wall of the base member 14, described below. In other embodiments, the tab 26 can extend between opposing portions of the wall 18. For instance, the tab 26 can travel across the interior surface 24, having a length approximately equal to the diameter of the cap member 12.

With reference to FIGS. 6-12, the base member 14 can be generally rounded (e.g. cylindrical) having a generally cup-like shape. Other shapes and sizes for the base member 14 are also possible. The base member 14 can comprise a wall 36 that extends circumferentially, forming an interior area 34 of the base member 14. In some embodiments, the base member 14, and/or cap member 12 can have a diameter that ranges between approximately 15-17 millimeters. In some embodiments, the base member 14 can be approximately 16 millimeters in diameter. Other sizes and diameters outside of this range are also possible.

The base member 14 can comprise a base 38. The wall 36 can extend orthogonally from the base 38. In some embodiments, the base 38 can be unitarily formed with the wall 36, whereas in other embodiments the base 38 can be formed separately from the wall 36 and coupled thereto, such as for example by adhesive or welding. The base 38 can comprise an opening 40. For example, the opening 40 can extend through the base 38, and can be sized and shaped so as to facilitate insertion of at least a portion of a fastener through the base member 14. For example, the opening 40 can be sized and shaped so as to allow insertion of a threaded or non-threaded shaft portion of a fastener (e.g. the end of a screw), but not the head of the fastener, thereby causing the head of the fastener to rest against and/or be restrained by the base 38 and surrounding wall 36. In turn, the head of the fastener can also secure the base member 14 to an object.

With continued reference to FIGS. 6-12, the exterior of the wall 36 of the base member 14 can comprise threads for coupling with the threads of the cap member 12, thereby attaching the base member 14 to the cap member 12. The threads can be wound in a right-hand or left-hand direction, and can comprise, for example, single or double threads. The threads can be used to rigidly and securely attach the base member 14 to the lid member 12, thereby making it difficult to remove the cap member 12 without unscrewing the cap member 12 from the base member 14.

With referenced to FIGS. 6, 7, 10, and 11, the wall 36 can further comprise a notch 42 in an end of the wall 36 opposite the base 38. The notch 42 can be configured to receive the tab 26. The notch 42 can include a stop surface, wherein in response to the tab 26 entering the notch 42 and coming into contact with the stop surface, the cap member 12 is prevented from being tightened further onto the base member 14. For instance, if the assembly 10 is configured such that the cap member 12 is tightened onto the base member 14 as the cap member 12 is rotated clockwise, in response to the tab 26 entering the notch 42 and coming into contact with the stop portion, the cap member 12 can no longer be rotated clockwise. The engagement between the notch 42 and the tab 26 can be further configured to allow the cap member 12 to be unscrewed from the base member 14 by hand or without the use of a special tool. The notch 42 can be located in a circumferential or rotational position relative to threads to permit sufficient tightening of the cap member 12 to inhibit or prevent unintentional loosening of the cap member 12, but preferably also allow removal of the cap member 12 by hand (gripped with fingers without the use of tools).

Figure 12:
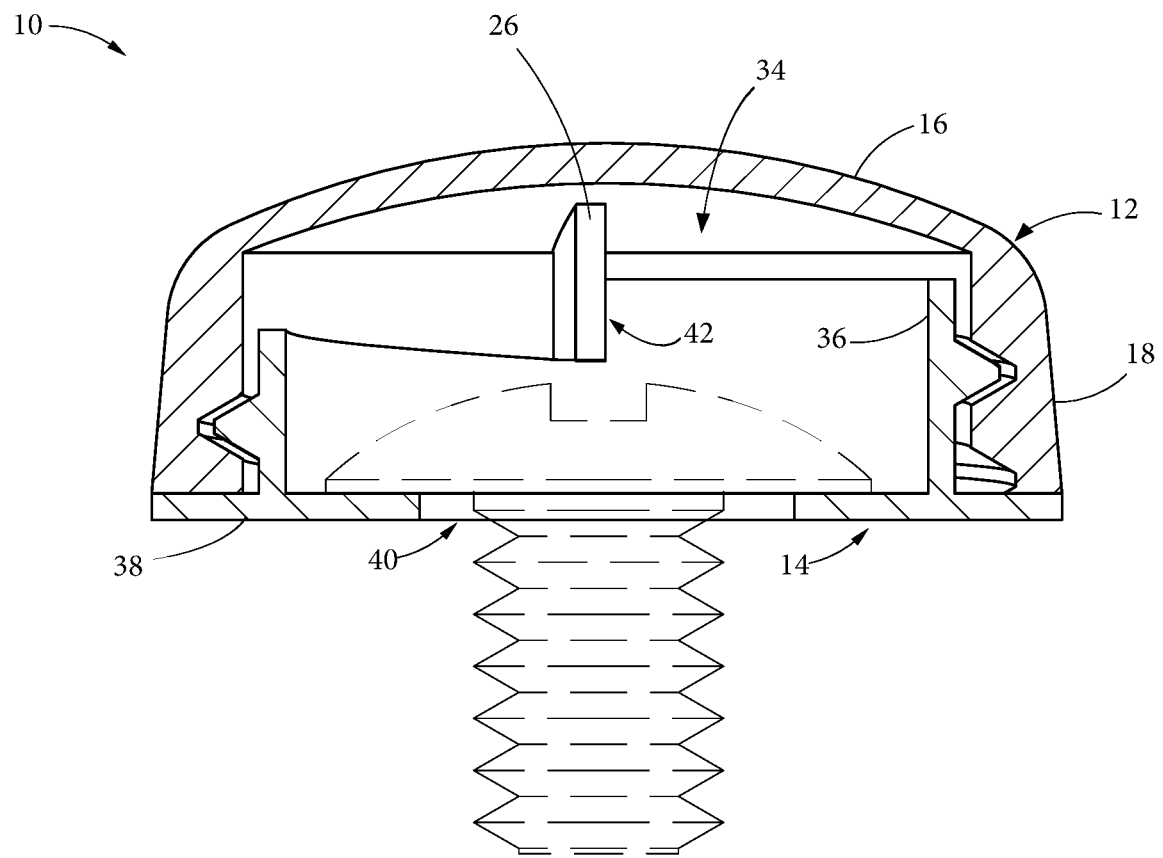
FIG. 12 is a front cross-sectional view of the assembly of FIG. 1, including hardware.

With reference to FIG. 12, an embodiment of a use of the assembly 10 is illustrated. The end of a fastener can first be placed through the opening 40 of base member 14. Once placed through the opening 40, the fastener head can be turned and tightened, and the license plate or other item can be fastened in place against a vehicle frame. The fastener can be tightened to a degree such that the fastener head presses tightly against the base 38, and the base 38 is held firmly against the vehicle frame or other object by frictional engagement. In this type of embodiment, the base 38 can act as a washer.

With continued reference to FIG. 12, once the fastener has been secured, the cap member 12 can be coupled to the base member 14. For example, the cap member 12 can be turned, thereby causing the cap member 12 to be screwed onto or otherwise attached to the base member 14. Once the cap member 12 is screwed onto the base member to a certain degree, the tab 26 enters the notch 42 and comes into contact with the stop surface, thereby preventing overtightening of the cap member 12.

Once the cap member 12 has been coupled to the base member 14, the fastener head can be housed within the confines of the assembly 10, out of sight. The inner surface 24 can be spaced away from the fastener head, thereby preventing interference with the fastener head.

Figure 13:
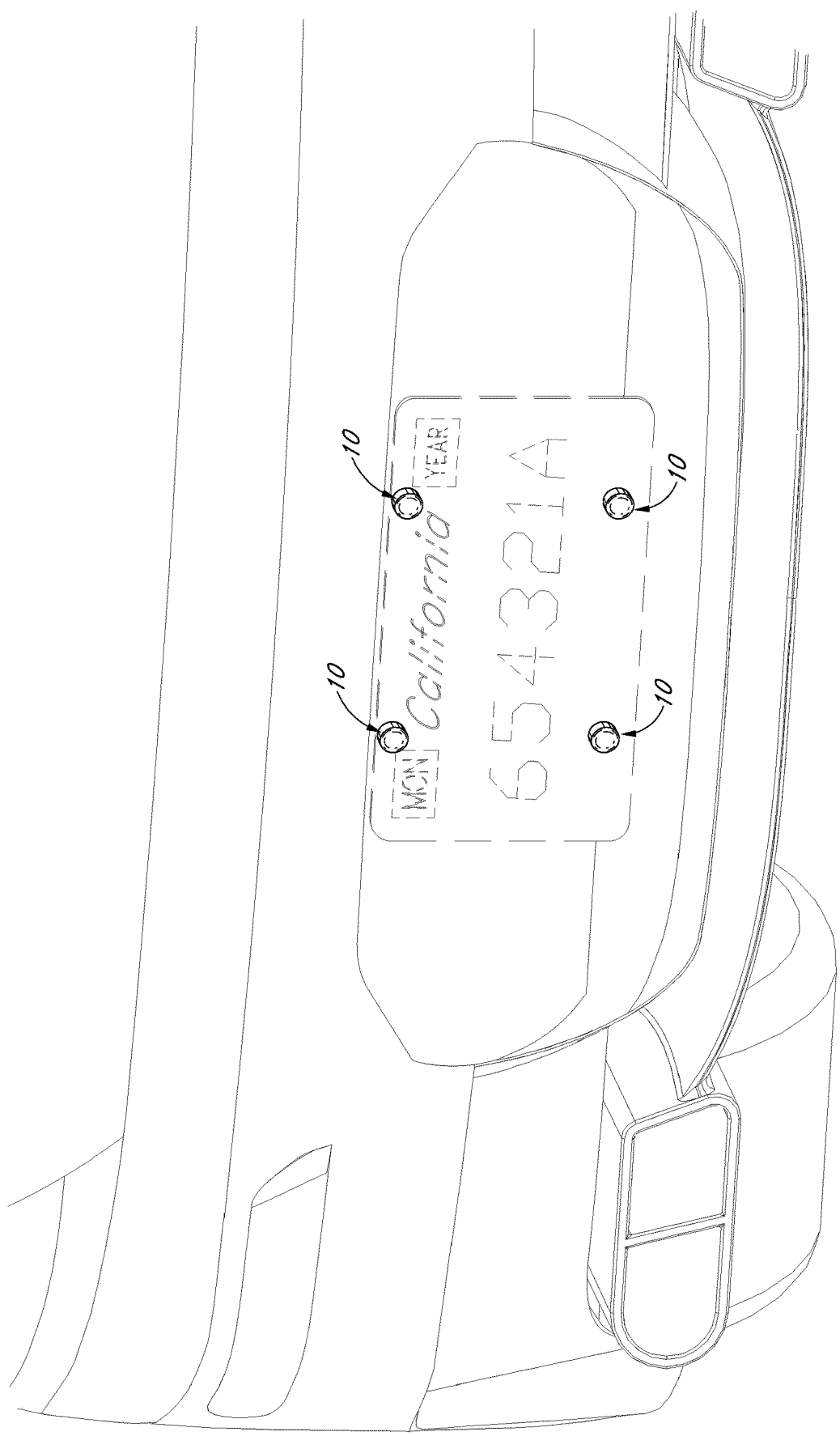
FIG. 13 is a perspective view of four hider cap assemblies of FIG. 1 as used, for example on license plate hardware.

As illustrated in FIG. 13, more than one assembly 10 can be used on a license plate or other object. Furthermore, the assembly 10 can be small and compact enough to inhibit destruction of the aesthetic appearance of the license plate or other object. In some embodiments, the cap member 12 can be decorated and/or designed so as to blend in with the object it is intended to be used with. For example, the cap member 12 (or the entire assembly 10) can be made white to blend in with a white license plate frame. In some embodiments, the cap member 12 can include markings or designs which signify the manufacturer of the assembly 10, of the license plate, or of any other product or service. In some embodiments, the assembly 10 can be used as advertisement for the vehicle for which it can be used. Additionally, in some embodiments, the assembly 10 can include markings or designs specialized or specific to the individual user.

While the assembly 10 described herein is described in the context of a two-part device (cap member 12 and base member 14), in other embodiments the assembly 10 can include one part or more than two parts. For example, in some embodiments the cap member 12 and base member 14 can be connected with a lanyard such that the cap member 12 is not accidentally dropped and/or lost during assembly or replacement of a fastener. In some embodiments, the base member 14 described herein can be formed integrally with, or in connection with, a license plate, marquis frame, license plate frame, or any other object that is intended to be fastened. For example, instead of having separate assemblies 10, the license plate in FIG. 14 can include base members 14 already formed in the license plate.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combinations or sub-combinations of the specific features and aspects of the embodiments can be made and still fall within the scope of the inventions.

What is claimed is:

1. A hardware hider cap kit comprising:
a cap member comprising a threaded interior wall and a tab protruding from the threaded interior wall;
a base member configured to be releasably coupled to the cap member, the base member comprising a base having an opening for receiving the end of a fastener, a threaded wall extending from the base, and a notch in the threaded wall for receiving the tab,
wherein the base member and the cap member form a cavity that receives and accommodates a head of the fastener, and
wherein, in response to rotating the cap member onto the base member, the tab engages an edge of the notch, thereby preventing further tightening of the cap member onto the base member.

2. The kit of claim 1, wherein the cap member can be attached to and separated from the base member by hand.

3. The kit of claim 1, wherein the engagement between the notch and the tab allows for the cap member to be untightened from the base member.

4. The kit of claim 1, wherein the cap member comprises an inner concave surface.

5. The kit of claim 1, wherein the base member has a generally cylindrical configuration.

6. The kit of claim 1, wherein the tab is formed separately from the cap member and is affixed to the cap member.

7. The kit of claim 1, wherein the cap member comprises a smooth outer convex surface.

8. The kit of claim 1, wherein the base member has a generally cylindrical shape having a diameter of approximately 16 millimeters.

9. A method of covering a fastener comprising:
providing a cap device comprising:
- a cap member having a tab formed in an interior of the cap member;
- a cup-shaped base member configured to couple with the cap member by threaded engagement, the base member having an opening along its bottom surface for receiving an end of a fastener, and a notch on a side wall of the base member for receiving the tab;

inserting a fastener through the opening and tightening the fastener against an object with sufficient force to secure the base member between the fastener and the object; and attaching the cap member to the base member by rotating the cap member, wherein, in response to rotating the cap member onto the base member, the tab engages a stop surface within the notch, thereby preventing further rotation of the cap member onto the base member.

10. The method of claim 9, wherein the object is a license plate.

11. The method of claim 9, wherein the fastener is a standard screw.

12. A cap assembly comprising:
a base member comprising:
- an opening in a bottom wall of the base member, the opening configured to receive a fastener;
- a side wall extending from the bottom wall, an exterior of the side wall comprising threads;
- a notch disposed on the side wall opposite the bottom wall;

a cap member configured to releasably couple with the base member, the cap member comprising:
- an interior wall comprising threads and configured to engage with the threads on the exterior of the side wall of the base; and
- a tab extending radially inward from the interior wall of the cap member and configured to contact an edge of the notch in the side wall of the base member;

wherein, in response to the tab contacting the edge of the notch, the cap member is prevented from rotating in a tightening manner onto the base member.

* * * * *